(12) United States Patent
Bogner et al.

(10) Patent No.: US 7,707,158 B2
(45) Date of Patent: Apr. 27, 2010

(54) METHOD AND COMPUTER PROGRAM PRODUCT FOR ENABLING DYNAMIC AND ADAPTIVE BUSINESS PROCESSES THROUGH AN ONTOLOGICAL DATA MODEL

(75) Inventors: Matthew Robert Bogner, Austin, TX (US); Belinda Ying-Chieh Chang, Naperville, IL (US); Robert Russell Cutlip, Cary, NC (US); Kevin Grigorenko, Trevose, PA (US)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 11/067,861

(22) Filed: Feb. 28, 2005

(65) Prior Publication Data

US 2006/0195330 A1 Aug. 31, 2006

(51) Int. Cl.
*G06F 17/30* (2006.01)
(52) U.S. Cl. ...................................... 707/102; 707/101
(58) Field of Classification Search ................. 707/100, 707/102, 101
See application file for complete search history.

(56) References Cited

U.S. PATENT DOCUMENTS

| | | | |
|---|---|---|---|
| 5,193,182 A | 3/1993 | Bachman et al. | 395/600 |
| 5,293,429 A | 3/1994 | Pizano et al. | 382/24 |
| 5,870,712 A | 2/1999 | Kiuchi et al. | 705/8 |
| 6,466,944 B1 | 10/2002 | Stokes | 707/102 |
| 6,507,856 B1 | 1/2003 | Chen et al. | 707/513 |
| 6,516,322 B1 | 2/2003 | Meredith | 707/102 |
| 6,665,648 B2 | 12/2003 | Brodersen et al. | 705/7 |
| 6,721,759 B1 | 4/2004 | Rising, III | |
| 2002/0055940 A1 | 5/2002 | Elkan | |
| 2003/0233374 A1 | 12/2003 | Spinola et al. | 707/104.1 |
| 2004/0054690 A1* | 3/2004 | Hillerbrand et al. | 707/104.1 |
| 2004/0093350 A1 | 5/2004 | Alexander et al. | 707/104.1 |
| 2004/0107124 A1* | 6/2004 | Sharpe et al. | 705/7 |
| 2004/0162741 A1 | 8/2004 | Flaxer et al. | 705/7 |
| 2004/0210552 A1 | 10/2004 | Friedman et al. | |
| 2005/0120353 A1* | 6/2005 | Zhang et al. | 719/310 |

(Continued)

FOREIGN PATENT DOCUMENTS

JP 2001325413 11/2001

OTHER PUBLICATIONS

Ghemawat et al., "The Google File System", Proceedings of the nineteenth ACM symposium on Operating systems principles, Oct. 2003, p. 29-43. Retrieved from the Internet:<URL: http://portal.acm.org/ft_gateway.cfm?id=945450&type=pdf&coll=ACM&dl=ACM&CFID=52095798&CFTOKEN=20622721>.*

(Continued)

*Primary Examiner*—Jean B. Fleurantin
*Assistant Examiner*—Dennis Myint
(74) *Attorney, Agent, or Firm*—Kunzler & McKenzie

(57) ABSTRACT

A method, computer program product, and a data processing system for selecting services of a business process for execution is provided. Ontological data is read from a data store, and an ontological model representative of the ontological data is then generated. The ontological model is mapped to a business process that comprises a plurality of sub-processes. The ontological model is used to select a subset of the plurality of sub-processes comprising the original business process resulting in a modified business process.

17 Claims, 4 Drawing Sheets

U.S. PATENT DOCUMENTS

2007/0209041 A1* 9/2007 Exley et al. .................. 719/328

OTHER PUBLICATIONS

Beck et al., "An end-to-end approach to globally scalable programmable networking", Proceedings of the ACM SIGCOMM workshop on Future directions in network architecture, Aug. 2003, p. 328-339. Retrieved from the Internet: <URL: http://portal.acm.org/ft_gateway.cfm?id=944772&type= pdf&coll=ACM&dl= ACM&CFID= 52095798&CFTOKEN=20622721>.*

IBM Research Disclosure 436174, "User-Controlled Notification in Workflow Management Systems", Aug. 2000, pp. 1490-1491.

Bogner et al., Method and Computer Program Product for Generating a Lightweight Ontological Data Model, Feb. 28, 2005.

Bogner et al., Method and Computer Program Product for Dynamic Weighting of an Ontological Data Model, Feb. 25, 2005.

* cited by examiner

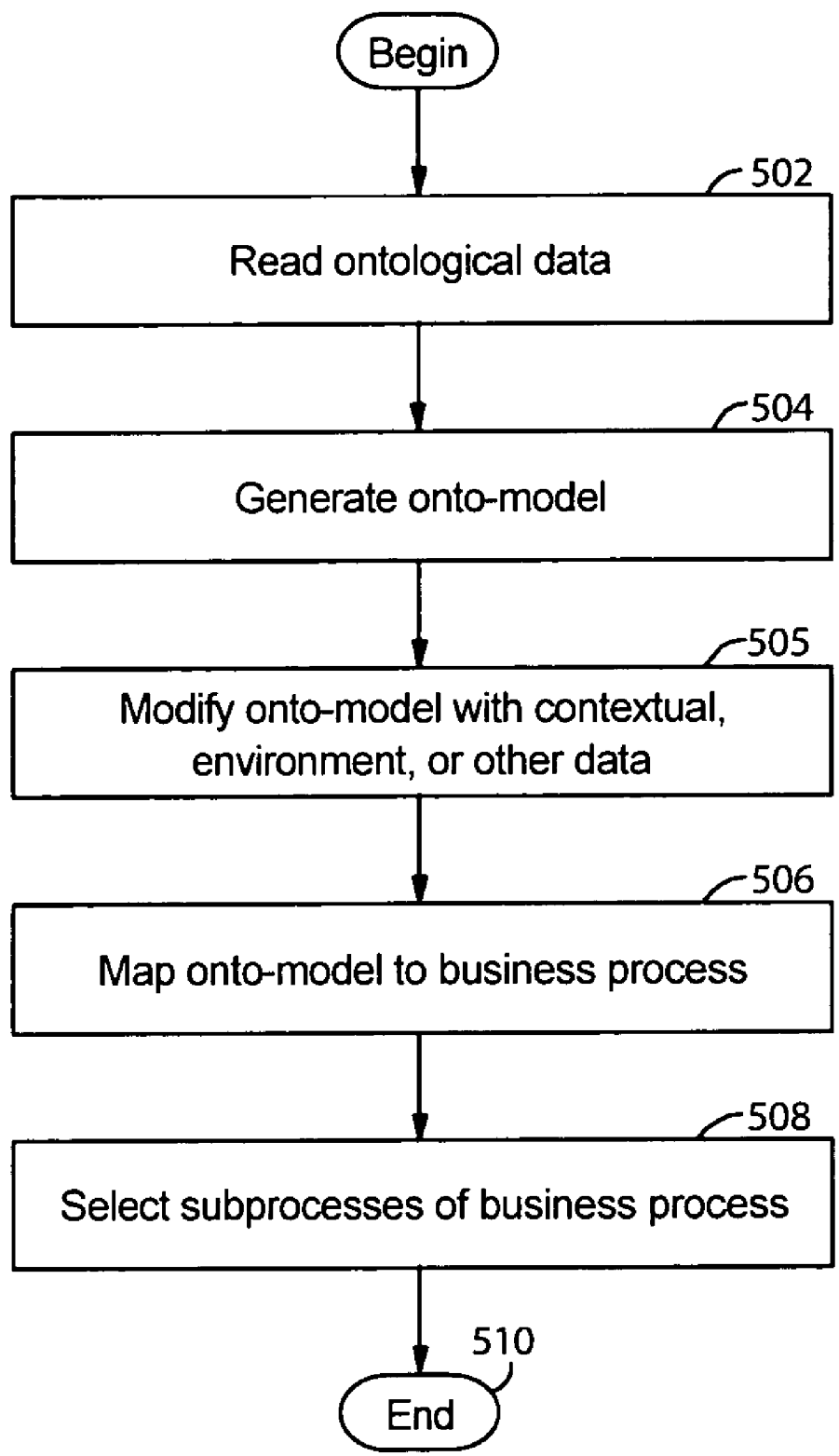

METHOD AND COMPUTER PROGRAM PRODUCT FOR ENABLING DYNAMIC AND ADAPTIVE BUSINESS PROCESSES THROUGH AN ONTOLOGICAL DATA MODEL

CROSS-REFERENCE TO RELATED APPLICATIONS

This application is related to commonly assigned and co-pending U.S. patent application Ser. No. 11/069,721 entitled "Method and Computer Program Product for Generating a Lightweight Ontological Data Model"; and U.S. patent application Ser. No. 11/067,341 entitled "Method and Computer Program Product for Dynamic Weighting of an Ontological Data Model" all of which are hereby incorporated by reference.

BACKGROUND OF THE INVENTION

1. Technical Field

The present invention relates generally to an improved data processing system and in particular to a data processing system and method for enabling dynamic and adaptive business processes through an ontological data model. Still more particularly, the present invention provides a method, computer program product, and a data processing system for enabling generation of a modified business process by mapping ontological data to a business process.

2. Description of Related Art

Enterprise systems are increasingly integrating various business systems and processes to facilitate data collaboration among various software systems. Business processes may be implemented in a proprietary software language or may be implemented using an industry standard language, such as the Business Process Execution Language (BPEL). Business processes define workflows that generally include a variety of tasks. Typically, managing the collaborative sharing of information in a business enterprise system is difficult.

Networks such as the Internet provide the ability for geographically diverse systems to communicate with very low latency with other systems or individuals. Many enterprise systems once limited to enterprise intranets are now being deployed on the Internet to exploit available Web services. However, in doing so, effective implementation of a business process requires integration of even more diverse data and systems. As such, effective implementation of business processes is becoming even more complex.

Thus, it would be advantageous to provide a mechanism that facilitates enabling dynamic and adaptive business processes. It would further be advantageous to provide a mechanism that facilitates business process adaptation or modification by mapping ontological data to a business process.

BRIEF SUMMARY OF THE INVENTION

The present invention provides a method, computer program product, and a data processing system for selecting services of a business process for execution. Ontological data is read from a data store, and an ontological model representative of the ontological data is then generated. The ontological model is mapped to a business process that comprises a plurality of sub-processes. The ontological model is used to select a subset of the plurality of sub-processes comprising the original business process resulting in a modified business process.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a business process flow selection routine in accordance with a preferred embodiment of the present invention.

DETAILED DESCRIPTION OF THE INVENTION

Figure 1:
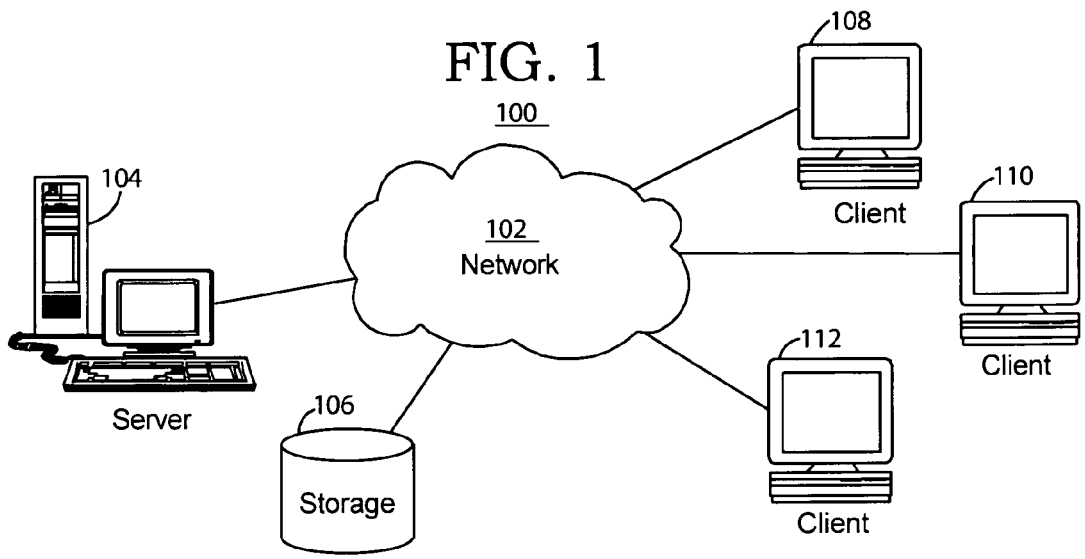
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
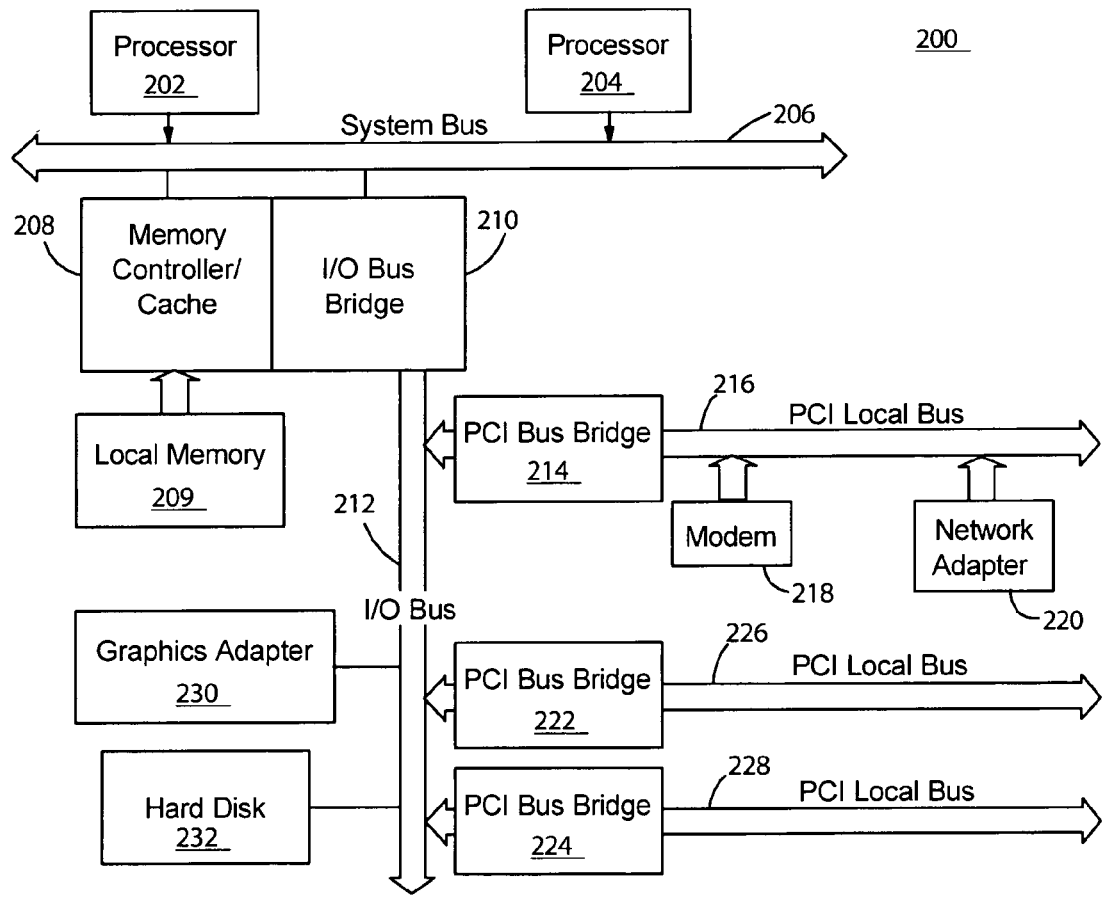
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pseries system, a product of International Business Machines Corporation in Armonk, N.Y., running the Advanced Interactive Executive (AIX) operating system or LINUX operating system.

Figure 3:
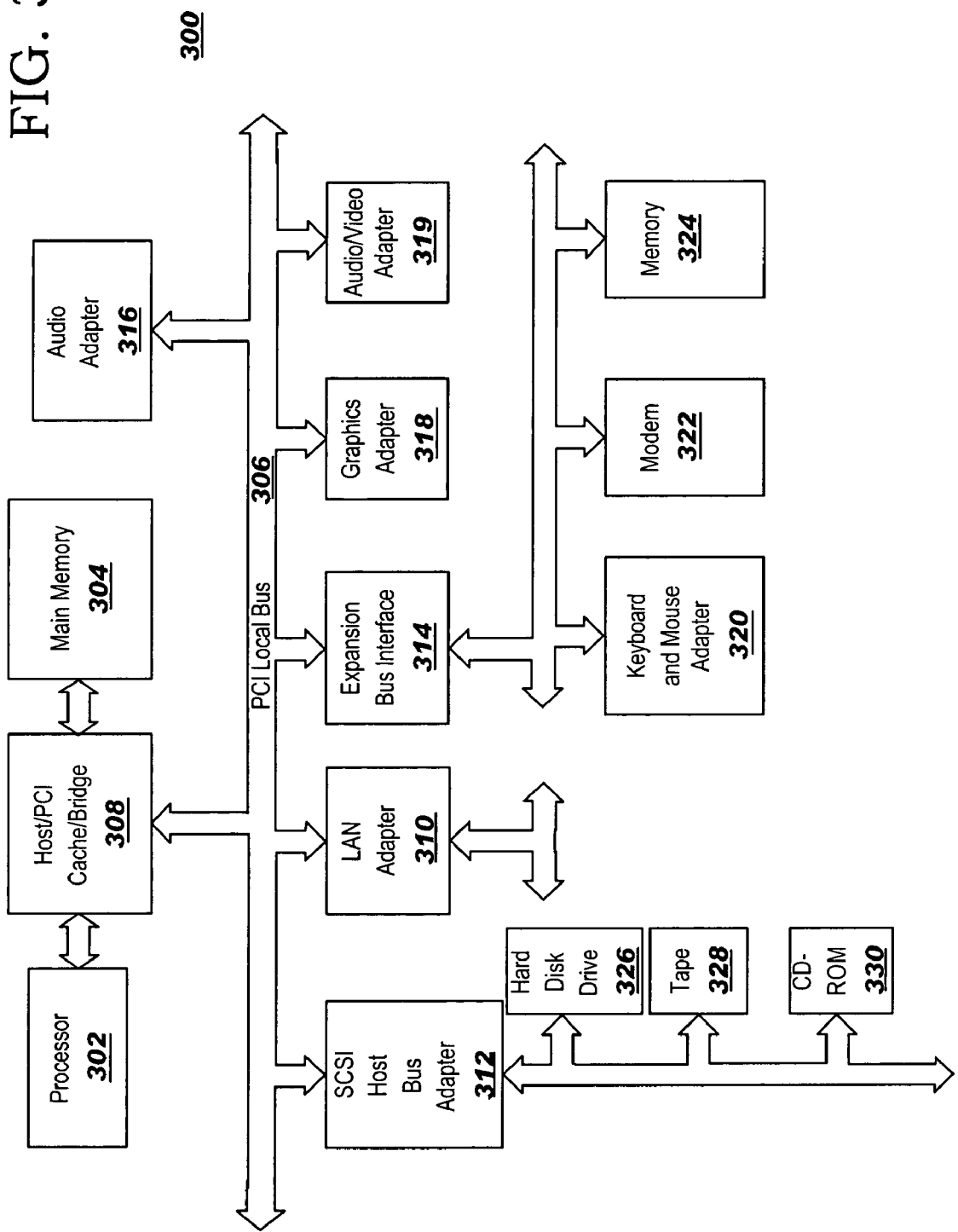
FIG. 3 is a block diagram illustrating a data processing system that may be implemented as a client in a network in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system. As another example, data processing system 300 may be a stand-alone system configured to be bootable without relying on some type of network communication interfaces. The depicted example in FIG. 3 and above-described examples are not meant to imply architectural limitations. For example, data processing system 300 also may be a notebook computer or hand held computer. Data processing system 300 also may be a kiosk or a Web appliance.

In accordance with a preferred embodiment of the present invention, a business process may be efficiently adapted or transformed. The business process may be represented, for example, by a BPEL template. An onto-model derived from ontologies is mapped against a business process template. The onto-model may be modified by contextual information at run-time that is not contained with the ontological data from which the onto-model is derived. A processing algorithm is applied to the onto-model to select preferred services of a business process. Particularly, a business process includes a plurality of variant sub-process sets. A modified business process is generated that includes a number of sub-processes, or services, respectively chosen for execution from variant sub-process sets by mapping the onto-model derived from an ontologies data store against the business process template. Selection of the particular sub-process variant is based on the generated onto-model. Thus, a "modified" business process is executed that comprises a one or more sub-processes selected from the sub-process variant sets.

Figure 4:
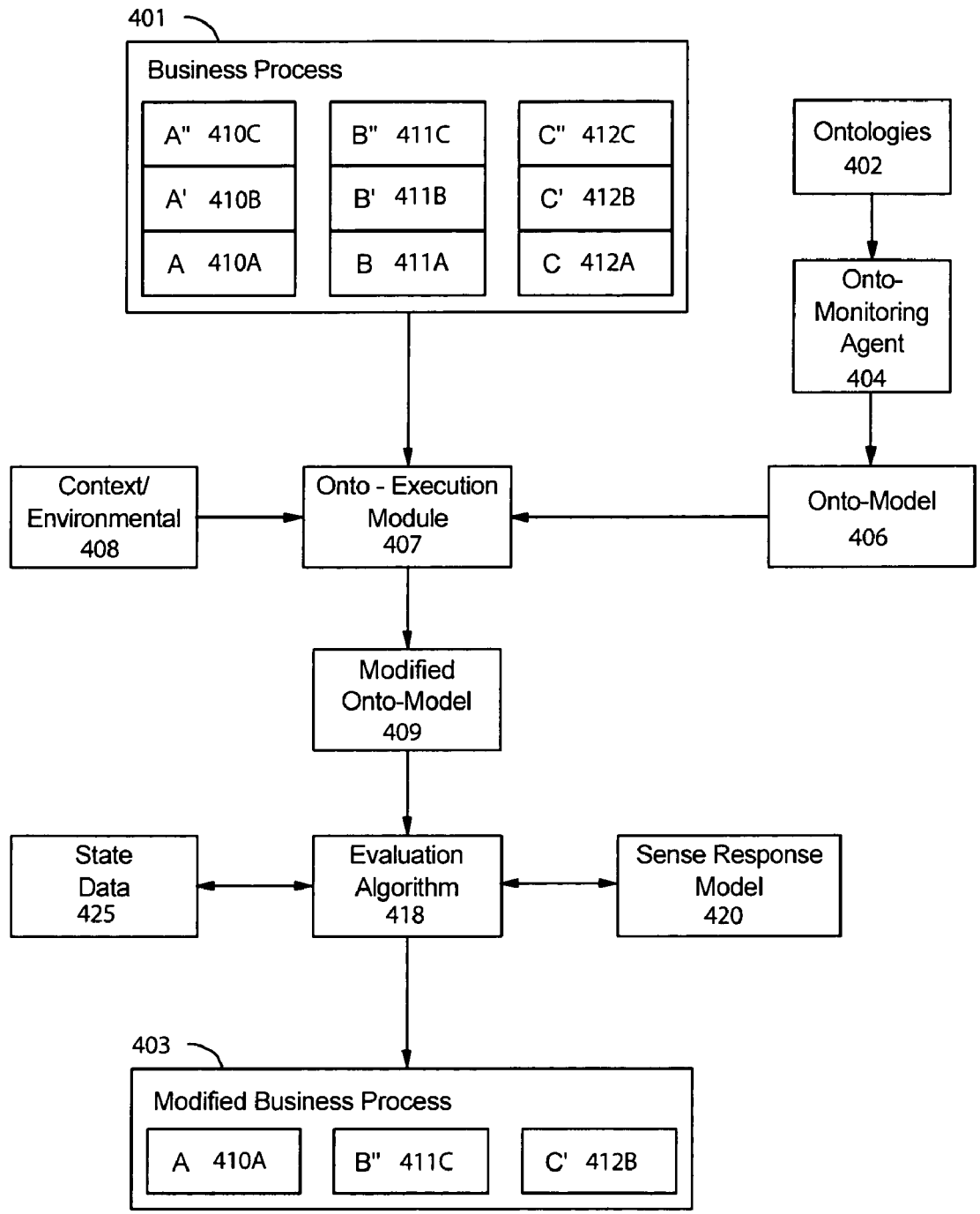
FIG. 4 is a diagrammatic illustration of a business process configuration in accordance with a preferred embodiment of the present invention.

With reference now to FIG. 4, a diagrammatic illustration of a business process configuration is shown in accordance with a preferred embodiment of the present invention. Business process 401 comprises a proprietary software language application or various integrated applications or may be implemented using an industry standard language, such as the Business Process Execution Language (BPEL). Business process 401 defines workflows that generally include a variety of tasks to perform enterprise processes. Business process 401 may be implemented using a platform independent standard, such as XML, that facilitates performing one or more business processes. Business process 401 defines more workflows, i.e., sub-processes, than those which will be executed during execution of. the business process. In the illustrative example, business process 401 comprises various sub-processes 410a-412c, or services, that respectively define service workflows. Sub-processes of a sub-process variant set define related services that deviate in some manner by one another, for example required inputs, outputs produced, data formats on which the services operate, or the like. In the illustrative example, three sub-process variant sets. 410-412 respectively comprising sub-processes 410a-410c, 411a-411c, and 412a-412c are shown. At any given execution cycle of business process 401, a sub-process of a sub-process variant set may be executed while other sub-processes of the same sub-process variant set are not executed. Selection of a particular subprocess for execution may be made by various environmental, context, or other data. For example, a sub-process of a sub-process variant set may be selected over other sub-processes of the same sub-process variant set due to cost constraints, latency constraints, various performance criteria, or any other suitable environmental or context data that may be defined and against which evaluation of a business sub-process may be made.

An ontology store 402 defines ontologies, e.g., relationships such as required input/outputs, required for interactions among various business sub-processes, e.g., sub-processes of business process 401. Onto-monitoring agent 404 reads ontological data from ontology store 402 and generates an onto-model 406 therefrom. Preferably, onto-model 406 comprises light-weight representations of ontologies defined in ontology store 402. Onto-model 406 is mapped to business process 401 for modifying business process 401 (or sub-processes thereof) at run time by onto-execution module 407. Onto-execution module reads the business process 401 and contextual or environmental data 408 and produces a modified onto-model 409 therefrom. Accordingly, onto-execution module 407 may make dynamic modifications to modified onto-model 409 at run time responsive to changes in contextual or environmental data 408. The modified onto-model is then supplied to one or more evaluation algorithms 418 for selecting business sub-processes. State data store 425 may record state data of different sub-processes to facilitate implementation of sense response model 420 as described more fully hereinbelow. Modified business process 403 is generated from the evaluation algorithm. As referred to herein, a modified business process comprises sub-processes of a business process wherein one or more sub-processes of the business process are selected from sub-process variant sets. In the illustrative example, a modified business process generated by mapping onto-model 406 to business process 401 comprises services 410a, 411c, and 412b.

With reference now to FIG. 5, a flowchart of a business process flow selection routine is shown in accordance with a preferred embodiment of the present invention. The business process flow selection routine is preferably implemented as one or more instruction sets that may be fetched from a memory device and executed by a processing unit, such as processor 202 shown in FIG. 2. The routine begins by reading ontological data (step 502), for example from ontology store 402 shown in FIG. 4. An onto-model is then generated from the ontological data read from the ontology store (step 504). For example, the onto-model may be generated as a directed graph. The onto-model may then be modified by contextual, environmental, or other data (step 505). The onto-model is then mapped to the business process (step 506). Sub-processes of the business process are then selected for execution based on the results of the ontological data mapped to the business process (step 508), and the business process flow selection routine then ends (step 510).

The processing steps shown in FIG. 5 may be performed by one or more different modules or applications at a central location in a network or they may be performed by one or more different modules or applications distributed at different processing nodes in a network of data processing systems. For example, the task of reading ontological data and generating an onto-model from the ontological data as described in steps 502 and 504 may be performed by onto-monitoring agent 404 shown in FIG. 4. The onto-monitoring agent may be implemented as a set of instructions executed by a processor of a data processing system that stores or interfaces with ontology store 404. The task of selecting the sub-processes of the business process may be performed by an evaluation algorithm implemented as a set of instructions executed by processor of another data processing system deployed in the network.

As described, a system that facilitates efficient adaptability of business processes is provided by embodiments of the present invention. Ontological data is mapped to a business process that defines a plurality of workflows. An evaluation of the ontological data that is mapped to the business process is performed to determine services of the business process to be executed. Contextual or other environmental data may be used to modify the ontological data model at runtime such that the business process that is executed is dynamically adapted responsive to changes in the context or environmental data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of computer readable media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of selecting services of a business process for execution, the method comprising the computer implemented steps of:

reading ontological data from a data store;

responsive to reading the ontological data, generating an ontological model representative of the ontological data;

responsive to generating the ontological model, mapping the ontological model to a pre-existing business process, wherein the business process defines a business workflow and comprises a plurality of predefined sub-processes having a sub-process that corresponds to at least one variant sub-process;

responsive to mapping the ontological model, selecting a set of the plurality of sub-processes for execution;

modifying the ontological model to produce a modified ontological model, wherein the ontological model mapped to the business process comprises the modified ontological model; and generating a modified business process from the modified ontological model.

2. The method of claim 1, wherein the ontological model is modified with environmental data.

3. The method of claim 2, wherein the ontological model is adapted to be modified with runtime modifications to the environmental data.

4. The method of claim 1, wherein the plurality of sub-processes comprise a plurality of sub-process variant sets.

5. The method of claim 4, wherein the set comprises a respective sub-process selected from each of the plurality of sub-process variant sets.

6. The method of claim 1, wherein the business process is defined by a business process execution language template.

7. A tangible computer readable medium having a computer program product encoded thereon for selecting services of a business process for execution, the computer program product comprising:

first instructions that read ontological data from a data store;

second instructions that, responsive to the first instructions reading the ontological data, generate an ontological model representative of the ontological data;

third instructions that, responsive to the second instructions generating the ontological model, map the ontological model to a pre-existing business process, wherein the business process defines a business workflow and comprises a plurality of predefined sub-processes having a sub-process that corresponds to at least one variant sub-process;

fourth instructions that, responsive to the third instructions mapping the ontological model to the business process, select a set of the plurality of sub-processes for execution;

fifth instructions that modify the ontological model to produce a modified ontological model, wherein the ontological model mapped to the business process comprises the modified ontological model; and sixth instructions that generate a modified business process from the modified ontological model.

8. The tangible computer readable medium of claim 7, wherein the ontological model is modified with environmental data.

9. The tangible computer readable medium of claim 8, wherein the ontological model is adapted to be modified with runtime modifications to the environmental data.

10. The tangible computer readable medium of claim 7, wherein the plurality of sub-processes comprise a plurality of sub-process variant sets.

11. The tangible computer readable medium of claim 10, wherein the set comprises a respective sub-process selected from each of the plurality of sub-process variant sets.

12. The tangible computer readable medium of claim 7, wherein the business process is defined by a business process execution language template.

13. A data processing system for selecting services of a business process for execution, comprising:

a memory that contains a selection routine as a set of instructions that selects a set of sub-processes of a plurality of predefined sub-process; and a processor interconnected with the memory that, responsive to execution of the set of instructions, receives an ontological model derived from ontological data, maps the ontological model to a pre-existing business process that defines a business workflow and comprises the plurality of predefined sub-processes having a sub-process that corresponds to at least one variant sub-process, selects the set of the plurality of sub-processes for execution, modifies the ontological model to produce a modified ontological model, wherein the ontological model mapped to the business process comprises the modified ontological model, and generates a modified business process from the modified ontological model.

14. The data processing system of claim 13, wherein the ontological model is modified with environmental data.

15. The data processing system of claim 14, wherein the ontological model is adapted to be modified with runtime modifications to the environmental data.

16. The data processing system of claim 13, wherein the plurality of sub-processes comprise a plurality of sub-process variant sets.

17. The data processing system of claim 16, wherein the set comprises a respective sub-process selected from each of the plurality of sub-process variant sets.

* * * * *